United States Patent
Lundstedt et al.

(10) Patent No.: US 11,448,119 B2
(45) Date of Patent: Sep. 20, 2022

(54) METHOD FOR CONTROLLING A TURBOCHARGER SYSTEM FOR A COMBUSTION ENGINE AND A TURBOCHARGER SYSTEM FOR USE TOGETHER WITH A COMBUSTION ENGINE

(71) Applicant: VOLVO TRUCK CORPORATION, Gothenburg (SE)

(72) Inventors: Björn Lundstedt, Lerum (SE); Marcus Olsén, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 3 days.

(21) Appl. No.: 16/766,457

(22) PCT Filed: Nov. 24, 2017

(86) PCT No.: PCT/EP2017/080401
§ 371 (c)(1),
(2) Date: May 22, 2020

(87) PCT Pub. No.: WO2019/101335
PCT Pub. Date: May 31, 2019

(65) Prior Publication Data
US 2020/0355112 A1    Nov. 12, 2020

(51) Int. Cl.
*F02B 37/02*    (2006.01)
*F02B 37/20*    (2006.01)
(Continued)

(52) U.S. Cl.
CPC ............. *F02B 37/02* (2013.01); *F02B 37/20* (2013.01); *F02B 63/06* (2013.01); *F02D 29/04* (2013.01);
(Continued)

(58) Field of Classification Search
CPC .......... F02B 37/02; F02B 37/10; F02B 37/20; F02B 63/06; F02B 21/00; F02D 29/04;
(Continued)

(56) References Cited

U.S. PATENT DOCUMENTS

| | | | |
|---|---|---|---|
| 6,182,634 B1 * | 2/2001 | Caldwell | F02D 29/04 |
| | | | 123/339.14 |
| 8,387,382 B1 | 3/2013 | Dunn | |

(Continued)

FOREIGN PATENT DOCUMENTS

| | | | |
|---|---|---|---|
| AT | 5138 U1 * | 3/2002 | ............. F02B 37/10 |
| AT | 5138 U1 | 3/2002 | |

(Continued)

OTHER PUBLICATIONS

International Search Report and Written Opinion dated Jul. 24, 2018 in corresponding International PCT Application No. PCT/EP2017/080401, 11 pages.

(Continued)

*Primary Examiner* — Loren C Edwards
(74) *Attorney, Agent, or Firm* — Venable LLP; Jeffri A. Kaminski

(57) ABSTRACT

The invention relates to a method for controlling a turbocharger system (10) fluidly connected to an exhaust manifold (102) of a combustion engine (100). The turbocharger system (10) comprises a turbocharger turbine (22) operable by exhaust gases from said exhaust manifold, and a tank (40) with pressurized gas, said tank being fluidly connectable to said turbocharger turbine. The method comprises the steps of: determining an engine operational mode in which the combustion engine runs below a predetermined speed, determining an external load requiring engine torque which at said engine operational mode would cause the combustion engine to stall, and subsequently injecting pressurized gas (Continued)

from said tank to drive said turbocharger turbine such that the turbocharger turbine is at least partly driven by said pressurized gas, thereby preventing stalling of the combustion engine.

20 Claims, 3 Drawing Sheets

(51) Int. Cl.
*F02B 63/06* (2006.01)
*F02D 29/04* (2006.01)
*F02D 41/00* (2006.01)
*F02D 41/02* (2006.01)
*F02D 41/04* (2006.01)

(52) U.S. Cl.
CPC ....... *F02D 41/0007* (2013.01); *F02D 41/021* (2013.01); *F02D 41/04* (2013.01); *F02D 2200/101* (2013.01); *F02D 2200/1002* (2013.01); *F02D 2250/00* (2013.01)

(58) Field of Classification Search
CPC .... F02D 41/0007; F02D 41/021; F02D 41/04; F02D 41/083; F02D 2200/1002; F02D 2200/101; F02D 2250/00; Y02T 10/12
See application file for complete search history.

(56) References Cited

U.S. PATENT DOCUMENTS

| | | | |
|---|---|---|---|
| 9,322,322 B2 | 4/2016 | Almkvist et al. | |
| 9,382,838 B2* | 7/2016 | Rollinger | ................ F02B 37/00 |
| 2009/0111655 A1* | 4/2009 | Hatanaka | ................ B60T 17/02 |
| | | | 477/218 |
| 2010/0095915 A1* | 4/2010 | Evans-Beauchamp | ...................... |
| | | | F02B 37/166 |
| | | | 123/68 |
| 2012/0216532 A1 | 8/2012 | Schaffeld et al. | |

FOREIGN PATENT DOCUMENTS

| | | | | |
|---|---|---|---|---|
| CN | 101952578 A | 1/2011 | | |
| CN | 103502600 A | 1/2014 | | |
| CN | 105922870 A | 9/2016 | | |
| DE | 102008000326 A1 | 8/2009 | | |
| EP | 2960458 A1 | 12/2015 | | |
| EP | 3061641 A1 * | 8/2016 | ............ | B60W 10/30 |
| EP | 3061641 A1 | 8/2016 | | |
| EP | 3095982 A1 | 11/2016 | | |
| FR | 872858 A | 6/1942 | | |
| FR | 2396869 A1 | 2/1979 | | |
| JP | H11 93679 A * | 4/1999 | ............ | Y02T 10/12 |
| JP | H1193679 A | 4/1999 | | |
| WO | 2014092578 A1 | 6/2014 | | |
| WO | 2017/044634 A1 | 3/2017 | | |

OTHER PUBLICATIONS

Cieslar, D. et al., "A Novel System for Reducing Turbo-Lag by Injection of Compressed Gas into the Exhaust Manifold", SAE International, Apr. 4, 2013, 8 pages.
China Office Action dated Dec. 9, 2021 in corresponding China Patent Application No. 201780097188.8, 22 pages.

* cited by examiner

METHOD FOR CONTROLLING A TURBOCHARGER SYSTEM FOR A COMBUSTION ENGINE AND A TURBOCHARGER SYSTEM FOR USE TOGETHER WITH A COMBUSTION ENGINE

CROSS-REFERENCE TO RELATED APPLICATIONS

This application is a U.S. National Stage application of PCT/EP2017/080401, filed Nov. 24, 2017 and published on May 31, 2019 as WO 2019/101335 A1, all of which is hereby incorporated by reference in its entirety.

TECHNICAL FIELD

The invention relates to a method for controlling a turbocharger system fluidly connected to an exhaust manifold of a combustion engine. The invention further relates to a computer program, a computer readable medium carrying a computer program, and to a control unit configured to perform the steps of the method for controlling a turbocharger system, to a turbocharger system, and to a vehicle comprising such turbocharger system or such control unit.

The invention is applicable on vehicles, in particularly low, medium and heavy duty vehicles commonly referred to as trucks. Although the invention will mainly be described in relation to a truck, it may also be applicable for other type of vehicles. Moreover, the invention is applicable to stationary combustion engines, such as e.g. combustion engines designed and configured for the production of electricity.

BACKGROUND

Combustion engines are used in moving applications such as e.g. in vehicles such as trucks or lorries designed to transport cargo. Combustion engines are also used in stationary applications e.g. for the production of electricity. Combustion engines typically vary in size and power depending on the application.

Some combustion engines are connected to a power take-off arrangement. The power take-off arrangement may e.g. comprise a hydraulic pump, at least one hydraulically driven movable member, and a hydraulic system driven by the hydraulic pump, and configured to power the at least one hydraulically driven movable member. The combustion engine, and possibly a separate electric motor, is coupled to the power take-off arrangement in order to drive the hydraulic pump. For example, for a truck, the hydraulically driven movable member may be a boom or a crane.

When the hydraulically driven movable member of the power take-off arrangement is operated, an external load is put on the combustion engine, which external load requires engine torque. In order to compensate for such external load, and e.g. to avoid stalling of the combustion engine, the operator typically increases the engine speed.

In the case the combustion engine is comprised in a vehicle, the main load is to propel the vehicle, and in the case the combustion engine is for generating electricity, the main load is to drive a generator. Moreover, regardless of whether a power-take off arrangement is coupled to the combustion engine or not, the combustion engine may be configured to operate other various applications requiring engine torque, such as e.g. clutch engagement, other than the main load of the combustion engine. Such other various applications requires engine torque and may risk stalling of the combustion engine, especially at low engine speeds such as idling, unless the previously described increase in engine speed is performed to compensate for the external load. Such increase in engine speed typically results in e.g. higher fuel consumption.

There is thus a need in the industry for further improvements relating to the items mentioned above.

SUMMARY

In view of the above-mentioned and other drawbacks of the prior art, the object of the present inventive concept is to provide an improved method of controlling a turbocharger system fluidly connected to an exhaust manifold of a combustion engine, and more specifically, for at least some engine operational modes of the vehicle, to improve the torque response of the combustion engine. The object is achieved by a method according to claim 1.

According to a first aspect of the invention, a method for controlling a turbocharger system fluidly connected to an exhaust manifold of a combustion engine is provided. The turbocharger system comprises a turbocharger turbine operable by exhaust gases from said exhaust manifold, and a tank with pressurized gas, said tank being fluidly connectable to said turbocharger turbine. The method comprising the steps of:

determining an engine operational mode in which the combustion engine runs below a predetermined speed, determining an external load requiring engine torque which at said engine operational mode would cause the combustion engine to stall, and subsequently injecting pressurized gas from said tank to drive said turbocharger turbine such that the turbocharger turbine is at least partly driven by said pressurized gas, thereby preventing stalling of the combustion engine.

By the provision of a method which comprises the step of injecting pressurized gas from said tank to drive said turbocharger turbine after that an external load requiring engine torque which at said engine operational mode would cause the combustion engine to stall has been determined (e.g. by that the combustion engine has been subject to an external load requiring said engine torque or by that an external load requiring said engine torque has been predicted before it actually extracts the torque from said combustion engine), stalling of the combustion engine may be prevented. Hence, for at least said engine operational mode in which the combustion engine runs below a predetermined speed, the torque response of the combustion engine can be improved by using pressurized gas from said tank. Moreover, by using pressurized gas from the tank to, at least partly, drive the turbocharger turbine, the engine speed need not to be increased in order to compensate for the external load. Hereby, the fuel economy of the combustion engine can be improved. Moreover, by using the pressurized gas from said tank based on predetermined conditions, such as e.g. said engine operational mode, the components of the turbocharger system related to the injection of pressurized gas can be activated when needed, and a too frequent use of such components can be avoided.

Described differently, when the combustion engine is operated in an engine operational mode in which the combustion engine runs below a predetermined speed, an external load requiring engine torque may cause the combustion engine to stall at said engine operational mode. Thus, by determining said engine operational mode in which the combustion engine runs below said predetermined speed, and determining said external load, injection of pressurized gas from said tank to drive said turbocharger turbine may be initiated in order to compensate for the extra engine torque the external load requires, and to counteract and/or prevent stalling of the combustion engine. Thus, the method may be referred to as a method for preventing stalling of a combustion engine by using a turbocharger system fluidly connected to an exhaust manifold of the combustion engine.

According to one embodiment, the injection of pressurized gas from said tank is adapted based on said engine operational mode, and said external load, in order to drive the turbocharger turbine to prevent stalling of the combustion engine. Thus, the pressure and/or the amount of pressurized gas injected from said tank is sufficient for driving the turbocharger turbine, or contributing in driving the turbocharger turbine, such that stalling of the combustion engine is prevented. According to one embodiment, the injection of pressurized gas from said tank is adapted based on at least the speed of the combustion engine (which may be referred to as the engine speed).

It should be noted that the term "determining" a specific parameter (as e.g. engine operational mode or external load) may comprise the means of detecting, measuring or modelling the specific parameter. However, the term "determining" a specific parameter may alternatively indicate that the specific parameter is set or controlled by e.g. a control unit, whereby instructions to set or to control the specific parameter is sent as an output signal from the control unit to relevant parts and component(s). For example, the engine speed may be measured by means of a tachometer, and/or the engine speed may be set by a control unit. Correspondingly, the external load which at said engine operational mode (i.e. at or below said predetermined speed) would cause the combustion engine to stall may be measured by e.g. a torque sensor or a transducer, or it may be modelled by measuring one or more stall indicating parameters, such as e.g. measuring the boost pressure of the turbocharger turbine. In the latter case, when the combustion engine is subject to an external load requiring engine torque, and the boost pressure falls below a certain limit, the external load may be determined as being an external load requiring engine torque which at said engine operational mode would cause the combustion engine to stall. The external load may also be set in a control unit, or even be predicted based on parameter input to a control unit. For example, an operator of the turbocharger system may request an external load, for example by operating an equipment driven by the combustion engine, and as a control unit of the combustion engine or the turbocharger system may handle such request or be involved in carrying out such instructions, the external load may be predicted and used together with the information of the engine operational mode to determine if the requested external load corresponds to a required engine torque which could cause the combustion engine to stall. Hence, according to one embodiment, the step of determining an external load requiring engine torque which at said predetermined engine operational mode would cause the combustion engine to stall, may comprise, or be comprised of, determining a predicted or demanded external load requiring engine torque which at said predetermined engine operational mode would cause the combustion engine to stall.

It should be noted that the external load is typically referring to a load originating from something other than the main load of the combustion engine, e.g. in the case the combustion engine is comprised in a vehicle, to propel the vehicle, and in the case the combustion engine is for generating electricity, to drive the generator.

According to one embodiment, the external load originates from at least one of the following: a clutch engagement, a power take-off arrangement, a hydraulic pump.

Thus, according to some example embodiments, said combustion engine is in operative connection with a power take-off arrangement, and said external load is a power take-off load from said power take-off arrangement. Hereby, the turbocharger system may be configured to compensate for an external load stemming from a power-take off arrangement, and thus prevent the combustion engine from stalling. The power take-off arrangement may for example be mechanically coupled to an engine crankshaft of the combustion engine by a power take-off gear arrangement. Thus, the combustion engine, and the engine crankshaft, may be arranged and configured for the main load of the combustion engine, and in parallel be arranged and configured for driving the power take-off arrangement.

According to one embodiment, said power take-off arrangement is in operative connection with a hydraulic system driven by an hydraulic pump, wherein said power take-off arrangement is coupled to, and thus driving, said hydraulic pump. The power take-off load thus corresponds to, or is requested by, said hydraulic pump.

Hence, an operator initiating an operation of an equipment driven by the hydraulic system, for example a lifting arm which is actuated by an hydraulic actuator, initiate, e.g. via a control unit, the operation of the hydraulic pump in response to the increased load, which in turn put a load on the power take-off arrangement which results in said external load requiring engine torque from said combustion engine. Thus, if the combustion engine is operated in said engine operational mode in which the combustion engine runs below a predetermined speed, and the external load is determined as an external load which would cause the combustion engine to stall, pressurized gas from said tank is injected to drive said turbocharger turbine in order to prevent stalling of the combustion engine.

According to one embodiment, the external load corresponds to, or originates from, a clutch engagement load. Thus, the external load put on the combustion engine needs not to originate from a power take-off arrangement, but may be associated with peripheral functions driven by the engine crankshaft. Thus, the turbocharger system may be configured to compensate for an external load stemming from a peripheral function, and thus prevent the combustion engine from stalling.

According to one embodiment, said predetermined speed is 250%, or 150%, or 100% of the idle speed of the combustion engine. Thus, the method may comprise the step of determining an engine operational mode in which the combustion engine runs below 250%, or below 150%, or below 100% of the idle speed of the combustion engine. Hereby, the injection of pressurized gas from said tank may be used compensate for the external load, in response to a set limit of the predetermined engine speed. A lower engine speed is typically associated with a higher risk of stalling the combustion engine (may be referred to as engine stalling). For example, in an engine operational mode in which the combustion engine is run below idle speed (i.e. below 100% of the idle speed), the idle speed governor of the combustion engine may be activated to keep the idle speed of the combustion engine. Such activation of the idle speed governor may be used as an indication that pressurized gas from said tank should be injected to drive the turbocharger turbine.

According to one embodiment, said step of injecting pressurized gas from said tank is independent of an engine speed increasing action of the combustion engine. Hereby, the turbocharger turbine may be driven by the pressurized gas, at least for when compensating for an external load which would cause the combustion engine to stall, independently of an engine speed increasing action of the combustion engine. For example, for a vehicle application of the combustion engine, said step of injecting pressurized gas from said tank is independent of a movement of the vehicle's accelerator pedal.

According to one embodiment, said turbocharger system comprises a valve for controlling the release of pressurized gas from said tank, and the method further comprises the step of operating the valve to release pressurized gas needed for preventing stalling of the combustion engine.

Hereby, a simple but yet effective way to control the release of pressurized gas from said tank is provided. The tank may e.g. be operated by an actuator, such as e.g. an electronic actuator, which is operated by a control unit. Moreover, the valve may control the release of pressurized gas from the tank to various locations before, to, and after the combustion engine, typically via a valve pipe fluidly connected to the valve and the respective various locations.

It should be understood that when stating that the tank is fluidly connectable to said turbocharger turbine, fluid in the tank may, in at least some operational modes, flow from the tank to the turbocharger turbine. For example, in operational modes in which the valve is opened (i.e. the valve allows fluid to pass), the tank may be in fluid connection with the turbocharger system, e.g. via a valve pipe connected to the exhaust manifold or the exhaust manifold pipe. Correspondingly, in operational modes in which the valve is closed (i.e. the valve prevents fluid to pass), no fluid is allowed to fluid from the tank to the turbocharger turbine. In other words, a fluid distribution system is typically arranged between the tank and the turbocharger system. The distribution system may comprise at least one pipe or conduit, and/or at least one valve, and/or at least some part or portion of the combustion engine.

For example, and according to one example embodiment, said turbocharger system further comprises a turbocharger compressor driven by said turbocharger turbine, and said combustion engine comprises an inlet manifold fluidly connected to said turbocharger compressor, wherein said valve controls the release of pressurized gas from said tank to the exhaust manifold of the combustion engine, to an exhaust manifold pipe arranged between the exhaust manifold and the turbocharger turbine, to the turbocharger turbine casing, to the inlet manifold of the combustion engine, to the turbocharger compressor casing, or to an inlet manifold pipe arranged between the inlet manifold and the turbocharger compressor. Hereby, the pressurized gas may be injected in various positions before, at or after the combustion engine. Hence, the valve pipe may be arranged between the valve and the exhaust manifold, the exhaust manifold pipe, the turbocharger turbine casing, the inlet manifold, the turbocharger compressor casing, or to the inlet manifold pipe.

In other words, the valve may be fluidly connected to (e.g. via the valve pipe) the exhaust manifold, the exhaust manifold pipe, the turbocharger turbine casing, the inlet manifold, the turbocharger compressor casing, or to the inlet manifold pipe.

In embodiments where the pressurized gas from said tank is injected upstream of the exhaust manifold of said combustion engine, i.e. to the inlet manifold of said combustion engine, to the inlet manifold pipe or to the turbocharger compressor casing, the injected pressurized gas will increase the fluid pressure and allow for an increased fuel injection and/or an increased amount of burnt fuel in the combustion engine, which will result in an increased energy in the combustion engine, and hence an increased pressure in the exhaust manifold and further to the turbocharger turbine. In other words, the injection of pressurized gas upstream of the exhaust manifold, results in an increased work of the turbocharger turbine. Thus, the pressurized gas is injected from said tank to drive said turbocharger turbine.

According to one embodiment, the valve is operated in such a way that the pressurized gas is released from said tank during at least 1 second, such as e.g. between 1 second and 5 seconds.

Such operational time of the valve is suitable for at least partly driving said turbocharger turbine with pressurized gas from said tank, in order to compensate for the external load.

According to one embodiment, the method comprises the step of initiating or increasing fuel injection to the combustion engine before, simultaneously with, or after said step of injecting pressurized gas from said tank to drive said turbocharger turbine. It should be understood that initiating or increasing of fuel injection to the combustion engine should be interpreted as the act of injecting fuel. Thus, the combination of injection of pressurized gas and the injection, or increase in injection, of fuel may increase the combustion engine's efficiency and/or power output.

According to one embodiment, the method comprises the step of:

initiating or increasing fuel injection to the combustion engine after said step of determining an engine operational mode in which the combustion engine runs below a predetermined speed, and prior to said step of injecting pressurized gas from said tank to drive said turbocharger turbine. Such timing of the injection or increasing of fuel is suitable for at least partly driving said turbocharger turbine in order to prevent stalling of said combustion engine.

According to at least a second aspect of the present invention, the object is achieved by a method for controlling a turbocharger system fluidly connected to an exhaust manifold of a combustion engine according to claim 10. The combustion engine is in operative connection with a power take-off arrangement. The turbocharger system comprises a turbocharger turbine operable by exhaust gases from said exhaust manifold, and a tank with pressurized gas, said tank being fluidly connectable to said turbocharger turbine. The method comprises the steps of:

determining an external load from said power take-off arrangement requiring engine torque, and in response to said external load from said power take-off arrangement, injecting pressurized gas from said tank to drive said turbocharger turbine such that the turbocharger turbine is at least partly driven by said pressurized gas, thereby preventing stalling of said combustion engine.

Hence, for this second aspect, the speed of the combustion engine needs not to be determined, as regardless of the engine speed the pressurized gas from the tank is advantageous to use for compensating for the power take-off load. In other words, the turbocharger system, and the tank with pressurized gas, can be used to compensate for external loads stemming from the power take-off arrangement. Thus, stalling of the combustion engine is prevented, at least the risk of stalling the combustion engine is reduced. Embodiments mentioned in relation to the first aspect of the present invention, and which is not related to a step of determining the speed of the combustion engine, are largely compatible with the second aspect of the invention.

For example, and according to one embodiment said power take-off arrangement is in operative connection with a hydraulic system driven by an hydraulic pump, wherein said power take-off arrangement is coupled to, and thus driving, said hydraulic pump, and wherein said external load is requested by said hydraulic pump. Thus, as mentioned previously, the external load may originate from the hydraulic pump coupled to the power take-off arrangement. Hereby, the injection of pressurized gas from said tank may be adapted to the load of the hydraulic pump.

According to at least a third aspect of the present invention, the object is achieved by a control unit according to claim 12. The control unit is configured to perform the steps of the method described in accordance with the first aspect or second aspect of the invention.

Effects and features of this third aspect of the present invention are largely analogous to those described above in connection with the first and second aspects of the inventive concept, respectively. Embodiments mentioned in relation to the first aspect of the present invention are largely compatible with the third aspect of the invention.

According to at least a fourth aspect of the invention, the object is achieved by a turbocharger system according to claim 13. More specifically, the invention relates to a turbocharger system for use together with a combustion engine having an exhaust manifold, said turbocharger system comprising:

a turbocharger turbine operable by exhaust gases from said exhaust manifold, a tank comprising pressurized gas, said tank being fluidly connectable to said turbocharger turbine, and a control unit wherein the control unit is configured to determine an engine operational mode in which the combustion engine runs below a predetermined speed, determine an external load requiring engine torque which at said engine operational mode would cause the combustion engine to stall, and subsequently initiate injection of pressurized gas from said tank to drive said turbocharger turbine such that the turbocharger turbine is at least partly driven by said pressurized gas to prevent stalling of the combustion engine.

Effects and features of this fourth aspect of the present invention are largely analogous to those described above in connection with the first aspect of the inventive concept. Embodiments mentioned in relation to the first aspect of the present invention are largely compatible with the fourth aspect of the invention, of which some embodiments are explicitly mentioned in the following. In other words, a method for controlling a turbocharger system as described with any of the embodiments of the first aspect of the invention is applicable to, or may make use of, the turbocharger system described in relation to the fourth aspect of the invention.

The turbocharger system may further comprise a turbocharger compressor driven by the turbocharger turbine to compress intake air to said combustion engine. Hence the turbocharger system comprises a turbocharger comprising the turbocharger turbine and the turbocharger compressor mechanically coupled to the turbocharger turbine by a turbine shaft. The turbocharger turbine is driven by exhaust gases from said combustion engine, and/or by pressurized air from said tank, and the turbocharger compressor is driven by the turbocharger turbine via said turbine shaft.

The combustion engine typically comprises an inlet manifold fluidly connected to said turbocharger compressor, for supplying fuel and/or air and/or a fuel-air mixture to the combustion engine. The inlet manifold is typically fluidly connected to the turbocharger compressor via an inlet manifold pipe arranged between the inlet manifold and the turbocharger compressor. Correspondingly, the exhaust manifold is typically fluidly connected to the turbocharger turbine via an exhaust manifold pipe arranged between the exhaust manifold and the turbocharger turbine.

For example, and according to one embodiment, said predetermined speed is 250%, 150%, or 100% of the idle speed of the combustion engine.

For example, and according to one embodiment, said external load originates from at least one of the following: a clutch engagement, a power take-off arrangement, a hydraulic pump.

For example, and according to one embodiment, the turbocharger system comprises a valve for controlling the release of pressurized gas from said tank, wherein said control unit is configured to control the operation of the valve to release pressurized gas needed for preventing stalling of the combustion engine. The release of pressurized gas by said valve may be set to occur during a pre-set time period of at least 1 second, or between 1 second and 5 seconds.

The valve may control the release of pressurized gas from said tank to various locations before, to, and after the combustion engine, typically via a valve pipe fluidly connected to the valve and the respective various locations. For example, the valve may be fluidly 35 connected to, and thus configured to release the pressurized air to, the exhaust manifold, the exhaust manifold pipe, the turbocharger turbine casing, the inlet manifold, the turbocharger compressor casing, and/or the inlet manifold pipe.

For example, and according to one embodiment, the turbocharger system comprises a compressor for supplying pressurized gas to said tank, wherein said control unit is configured to initiate charging or recharging of the tank with pressurized gas using said compressor.

According to at least a fifth aspect of the invention, the object is achieved by a turbocharger system according to claim 18. More specifically, the invention relates to a turbocharger system for use together with a combustion engine having an exhaust manifold, said combustion engine being in operative connection with a power take-off arrangement, wherein said turbocharger system comprises:

a turbocharger turbine operable by exhaust gases from said exhaust manifold, a tank comprising pressurized gas, said tank being fluidly connectable to said turbocharger turbine, and a control unit wherein the control unit is configured to determine an engine operational mode in which the combustion engine runs below a predetermined speed, determine an external load from said power take-off arrangement requiring engine torque, and in response to said external load from said power take-off arrangement, initiate injection of pressurized gas from said tank to drive said turbocharger turbine such that the turbocharger turbine is at least partly driven by said pressurized gas to prevent stalling of the combustion engine.

Hence, for this fifth aspect, the speed of the combustion engine needs not to be determined by the control unit, as regardless of the engine speed, the pressurized gas from the tank is advantageous to use for compensating for the power take-off load. Embodiments mentioned in relation to the fourth aspect of the present invention, and which is not related to a step of determining the speed of the combustion engine, are largely compatible with the fifth aspect of the invention.

For example, and according to one embodiment said power take-off arrangement is in operative connection with a hydraulic system driven by an hydraulic pump, wherein said power take-off arrangement is coupled to, and thus driving, said hydraulic pump, and wherein said external load is requested by said hydraulic pump. Thus, as mentioned previously, the external load may originate from the hydraulic pump coupled to the power take-off arrangement.

According to at least a sixth aspect of the invention, the object is achieved by a vehicle according to claim 19. More specifically, the invention relates to a vehicle comprising a turbocharger system in accordance with the fourth aspect or the fifth aspect of the invention, or a control unit in accordance with the third aspect of the invention.

Thus, the vehicle may comprise the combustion engine, the turbocharger system and optionally the power take-off arrangement with associated hydraulic pump and hydraulic system. Thus, the vehicle may comprise the control unit being configured according to any embodiment described with the third aspect of the invention.

According to one embodiment, the combustion engine is an internal combustion engine such as e.g. a diesel driven internal combustion engine.

According to at least a seventh aspect of the present invention, the object is achieved by a computer program according to claim 20, the computer program comprising program code means for performing the steps of the first aspect or second aspect of the invention, when said program is run on a computer. The computer may e.g. be comprised in, or be comprised of, the control unit of the third aspect of the invention.

Effects and features of this seventh aspect of the present invention are largely analogous to those described above in connection with the third aspect of the invention. Embodiments mentioned in relation to the first aspect of the present invention are largely compatible with the seventh aspect of the invention.

According to at least an eighth aspect of the present invention, the object is achieved by a computer readable medium according to claim 21, the computer readable medium carrying a computer program comprising program code means for performing the steps of the first aspect or second aspect of the invention, when said program product is run on a computer. The computer readable medium may e.g. be comprised in the control unit of the third aspect of the invention.

Effects and features of this eighth aspect of the present invention are largely analogous to those described above in connection with the third aspect of the invention. Embodiments mentioned in relation to the first aspect of the present invention are largely compatible with the eighth aspect of the invention.

According to a further aspect of the invention, the object is achieved by a combustion engine system comprising a combustion engine having an exhaust manifold and a turbocharger system in accordance with the fourth aspect of the invention or the fifth aspect of the invention. The combustion engine system may further comprise a power take-off arrangement mechanically coupled to the combustion engine, and in operative connection with a hydraulic system driven by an hydraulic pump, wherein said power take-off arrangement is coupled to, and thus driving, said hydraulic pump.

Further advantages and advantageous features of the invention are disclosed in the following description and in the dependent claims.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
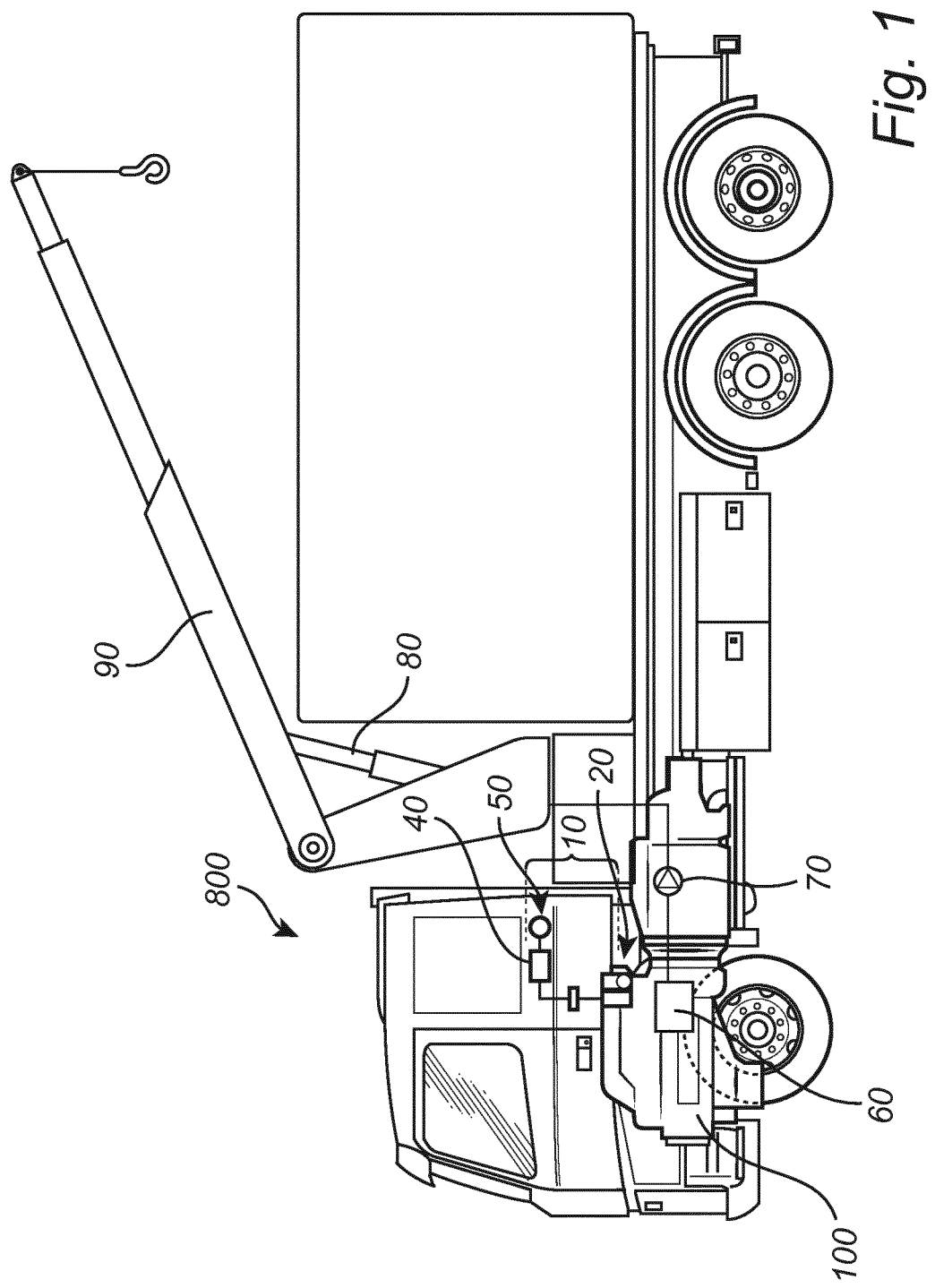
FIG. 1 is a side view of a vehicle comprising a combustion engine and a turbocharger system in accordance with one example embodiment of the present invention.

The present invention will now be described more fully hereinafter with reference to the accompanying drawings, in which an exemplary embodiment of the invention is shown. The invention may, however, be embodied in many different forms and should not be construed as limited to the embodiment set forth herein; rather, the embodiment is provided for thoroughness and completeness. Like reference character refer to like elements throughout the description.

With particular reference to FIG. 1, there is provided a vehicle 800 with a combustion engine 100, such as an internal combustion engine 100, and a turbocharger system 10 comprising a turbocharger 20, a tank 40 with pressurized air and a control unit 50, such as e.g. an ECU 50, according to the present invention (further described below with reference to FIG. 2). The combustion engine 100 is in FIG. 1 coupled to power take-off arrangement 60 configured for taking power or torque from the combustion engine 100 and transmitting it to drive an application 90, in FIG. 1 embodied as a crane 90. More specifically, the power take-off arrangement 60 is coupled to, and thus configured to drive, a hydraulic pump 70, wherein the hydraulic pump 70 is configured to pressurize a hydraulic system 80, here embodied as a hydraulic driven actuator 80 of the crane 90. The vehicle 800 depicted in FIG. 1 is a truck 800 for which the inventive concept which will be described in detail below, is particularly suitable for.

Figure 2:
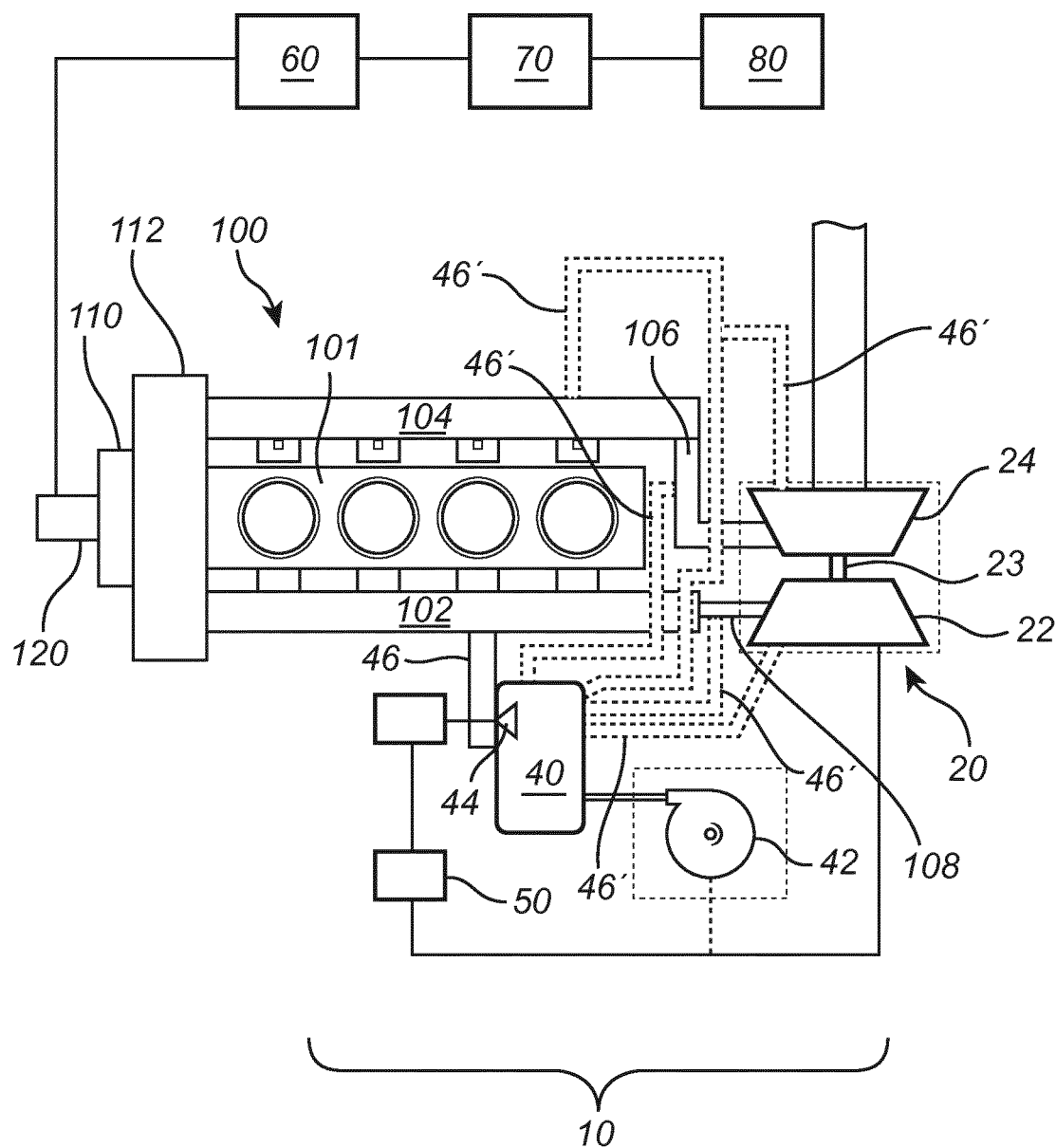
FIG. 2 shows a schematic overview of the combustion engine and the turbocharger system of FIG. 1, in accordance with one example embodiment of the present invention.

FIG. 2 shows a schematic overview of at least parts of a combustion engine 100 and a turbocharger system 10. In the non-limiting example of FIG. 2, the combustion engine 100 comprises an engine block 101 in a four-cylinder, four-stroke, diesel engine with a gear box 110 and a clutch 112 that is connected to an engine crankshaft 120. The combustion engine 100 of FIG. 2 comprises an inlet manifold 104 fluidly connected intake port (not shown) of the combustion engine 100, for supplying fuel and/or air and/or a fuel-air mixture to the combustion engine 100. Correspondingly, the combustion engine 100 comprises an exhaust manifold 102 fluidly connected to an exhaust after treatment system (not shown) of the combustion engine 100.

In the example embodiment shown in FIG. 2, the engine crankshaft 120 is connected to a power take-off arrangement 60 configured for taking power or torque from the combustion engine 100 and transmitting it to an application, such as e.g. an attached implement or a separate machine. In FIG. 2, the power take-off arrangement 60 is coupled to, and thus configured to drive, a hydraulic pump 70, wherein the hydraulic pump 70 is configured to pressurize a hydraulic system 80 for driving e.g. the attached implement.

In the example of FIG. 2, the combustion engine 100 is overloaded by means of the turbocharger system 10. More specifically, the turbocharger system 10 comprises a turbocharger 20 having a turbocharger turbine 22 and a turbocharger compressor 24 of known type coupled to the turbocharger turbine 22 by a turbine shaft 23. The turbocharger turbine 22 is operable by exhaust gases from the exhaust manifold 102, and thus drives the turbocharger compressor 24 via the turbine shaft 23. The turbocharger compressor 24 is fluidly connected to the inlet manifold 104 via an inlet manifold pipe 106, and is configured for compressing intake air to the combustion engine 100. Optionally, an intercooler (not shown) may be arranged in fluid contact between the turbocharger compressor 24 and the inlet manifold 104. Correspondingly, the turbocharger turbine 22 is fluidly connected to the exhaust manifold 102 via an exhaust manifold pipe 108, and is configured for driving the turbocharger compressor 24 via the turbine shaft 23. In other words, the exhaust manifold pipe 108 is fluidly connected between the exhaust manifold 102 of the combustion engine 100 and the turbocharger turbine 22.

As shown in FIG. 2, the turbocharger system 10 further comprises a tank 40 with pressurized gas, a compressor 42 for supplying pressurized gas to the tank 40, and a valve 44 for controlling the release of pressurized gas from the tank 40. The turbocharger system 10 in FIG. 2 further comprises a control unit 50 connected to the valve 44 and the compressor 42. In FIG. 2, the valve 44 may control the release of pressurized gas from the tank 40 to various locations before, to, and after the combustion engine 100, typically via a valve pipe 46 fluidly connected to the valve 44 and the respective various locations. In FIG. 2, the valve pipe 46 is arranged to provide the pressurized gas from the tank 40 to the exhaust manifold 102, but as indicated with dashed valve pipes 46', the pressurized gas from the tank 40 may alternatively be injected to the exhaust manifold pipe 108, the turbocharger turbine 22 casing, the inlet manifold 104, the turbocharger compressor 24 casing, or the inlet manifold pipe 106.

The operation of the turbocharger system 10 and the function of the control unit 50 will now be described in more detail. The control unit 50 is configured to determine an engine operational mode in which the combustion engine 100 runs below a predetermined speed, and determine an external load requiring engine torque which at the engine operational mode (i.e. at or below the predetermined speed) would cause the combustion engine 100 to stall, and subsequently to initiate injection of pressurized gas from the tank 40 to the turbocharger turbine 22 such that the turbocharger turbine 22 is at least partly driven by the pressurized gas. Hereby, stalling of the combustion engine 100 may be prevented. Moreover, by using pressurized gas from the tank 40 to, at least partly, drive the turbocharger turbine 22, the engine speed needs not to be increased in order to compensate for the external load. In other words, the injection of pressurized gas from the tank 40 may be independent of an engine speed increasing action of the combustion engine 100. For example, if the combustion engine 100 and the turbocharger system 10 are comprised in a vehicle, the injection of pressurized gas from the tank 40 may be independent of the vehicle's 800 accelerator pedal.

More specifically, the control unit 50 is configured to initiate injection of pressurized gas from the tank 40 to at least partly drive the turbocharger turbine 22 by controlling the operation of the valve 44 to release pressurized gas needed for preventing stalling of the combustion engine 100. The control unit 50 may e.g. be configured to release pressurized gas from the tank 40 for a pre-set time period of at least 1 second, or between 1 second and 5 seconds. For example, the size of the tank, and the release of pressurized gas via the valve 44, may be sized and dimensioned such that the tank 40 is fully depleted or emptied after e.g. 5 seconds. Thus, the turbocharger system 10, and the turbocharger turbine 22, may be operated by pressurized gas from the tank 40 e.g. for at least 5 seconds. When the tank 40 has been at least partly depleted or emptied, it may be recharged using e.g. the compressor 42. According to one embodiment, the control unit 50 is configured to initiate recharging of the tank 40 with pressurized gas using the compressor 42.

According to one example embodiment, the predetermined speed is 250%, or 150%, or 100% of the idle speed of the combustion engine. Thus, the control unit 50 may be configured to determine an engine operational mode in which the combustion engine 100 runs below 250%, or below 150%, or below 100% of the idle speed of the combustion engine 100. Typically, for a given external load requiring engine torque, a lower speed of the combustion engine 100 (engine speed) corresponds to a higher risk of stalling the combustion engine 100 (engine stalling). Thus, at engine speeds below 100% of the idle speed, i.e. at engine speeds below idling, the risk of engine stalling is relatively high, and the use of pressurized gas injected to drive the turbocharger turbine 22 is especially advantageous.

According to one example embodiment, the external load may be a power take-off load from the power take-off arrangement 60. For example, the hydraulic pump 70, which is configured to pressurize the hydraulic system 80, may be driven by the power take-off arrangement 60, and the power take-off load may thus be a load related to the hydraulic pump 70. In other words, the power take-off arrangement 60 drives the hydraulic pump 70 which drives, or pressurizes, the hydraulic system 80, which in turn may be used to operate e.g. an hydraulic actuator, and the external load may correspond to the power take-off load needed for operating the hydraulic pump 70. According to one example embodiment, the external load may be a clutch engagement load, or in other words, the external load may correspond to a load stemming from a clutch engagement.

According to an alternative example embodiment, the control unit 50 is configured to determine an external load from the power take-off arrangement 60 requiring engine torque, and in response to the external load from the power take-off arrangement 60, injecting pressurized gas from the tank 40 to the turbocharger turbine 22 such that the turbocharger turbine 22 is at least partly driven by the pressurized gas. Hereby, the speed of the combustion engine 100 needs not to be increased in order to compensate for the power take-off, but the external load from the power take-off arrangement 60 may instead be compensated for by the pressurized gas from the tank 40. Hence, for such embodiments, the speed of the combustion engine 100 needs not to be determined, as regardless of the engine speed, the pressurized gas from the tank 40 is advantageous to use for compensating for the power take-off load. As mentioned previously, the external load may originate from the hydraulic pump 70 coupled to the power take-off arrangement 60.

It should be noted that the vehicle 800 in FIG. 1, may comprise the combustion engine 100, the turbocharger system 10 and optionally the power take-off arrangement 60 with associated hydraulic pump 70 and hydraulic system 80.

Thus, the vehicle 800 may comprise the control unit 50 being configured according to any embodiment described with reference to FIG. 2.

The present invention also relates to a method for controlling a turbocharger system, as e.g. the turbocharger system 10 shown in FIG. 2, fluidly connected to an exhaust manifold of a combustion engine (also shown in FIG. 2). Thus, the present invention will hereafter be described with reference to the above described combustion engine 100 and turbocharger system 10 in a non-limiting way, with reference to the flow-chart in FIG. 3 (hence, the reference numerals of FIG. 1 and FIG. 2 are used below when describing the steps of the method in the flow-chart in FIG. 3).

In a first step 601, an engine operational mode in which the combustion engine 100 runs below a predetermined speed is determined. The engine operational mode may e.g. be defined based on the engine speed, or on a threshold engine speed, which for example is detected by the control unit 50, or is set and controlled by the control unit 50 (i.e. the control unit 50 instructs the combustion engine 100 to operate according to an engine operational mode in which the combustion engine 100 runs below the predetermined speed).

It should be understood that the combustion engine 100 typically has a plurality of engine operational modes corresponding to modes or states or conditions to how the combustion engine 100 is operated, and that some of the engine operational modes corresponds to a state in which the engine speed is below the predetermined speed. Hence, other engine parameters, such as e.g. air inlet temperature, timing of fuel injection, etc. may vary in the engine operational mode, but the speed of the combustion engine 100 will be below the predetermined speed.

According to one embodiment, the engine operational mode in which the combustion engine 100 is operated at an engine speed below the predetermined speed is a first engine operational mode, wherein the control unit 50 is configured to determine a second engine operational mode in which the combustion engine 100 is operated at an engine speed below the predetermined speed, the second engine operational mode occurring subsequent to the first engine operational mode. During, or at, the second engine operational mode, the control unit 50 may be configured to stop the injection of pressurised gas from the tank 40. The predetermined speed may for example be set to 250%, or 150%, or 100% of the idle speed of the combustion engine 100.

In a second step 603 an external load requiring engine torque which at the engine operational mode, i.e. at or below the predetermined speed of the combustion engine 100, would cause the combustion engine 100 to stall is determined. The external load may e.g. originate from a clutch engagement, a power take-off arrangement 60, or a hydraulic pump 70. The external load may be detected by the control unit 50, or may be set and controlled by using the control unit 50. More specifically, and according to one example, an operator of the turbocharger system 10 may request an external load, or a power take-off of the combustion engine 100, for example by operating an equipment driven by the previously described hydraulic system 80 (and thus hydraulic pump 70), or by making a clutch engagement, and as the control unit 50 may handle such request or be involved in carrying out such instructions, the corresponding information may be handled by the control unit 50, and it may thus be used to determine that the requested external load corresponds to a required engine torque which could cause the combustion engine 100 to stall at, or below, the predetermined speed. According to one embodiment, the external load requiring engine torque which at, or below, the predetermined speed would cause the combustion engine 100 to stall is determined by measuring one or more capacity parameters, such as e.g. the boost pressure of the turbocharger turbine 22. If the boost pressure falls below a certain limit, due to an external load to the combustion engine 100, the control unit 50 can determine that the external load may cause the combustion engine 100 to stall.

According to one embodiment, the turbocharger system 10 comprises a valve 44 for controlling the release of pressurized gas from the tank 40, as previously described. Thus, in an optional third step 605, the valve 44 is operated to release pressurized gas from the tank 40. As previously described, the valve 44 may be connected to a valve pipe 46 which in turn is connected to supply the pressurized gas to the exhaust manifold 102, the exhaust manifold pipe 108, the turbocharger turbine 22 casing, the inlet manifold 104, the turbocharger compressor 24 casing, and/or the inlet manifold pipe 106. The valve 44 may be operated in such a way that the pressurized gas is released from the tank 40 during at least 1 second, such as e.g. between 1 second and 5 seconds.

In a fourth step 607, pressurized gas from the tank 40 is injected to drive the turbocharger turbine 22, such that the turbocharger turbine 22 at least partly is driven by the pressurized gas.

Figure 4:
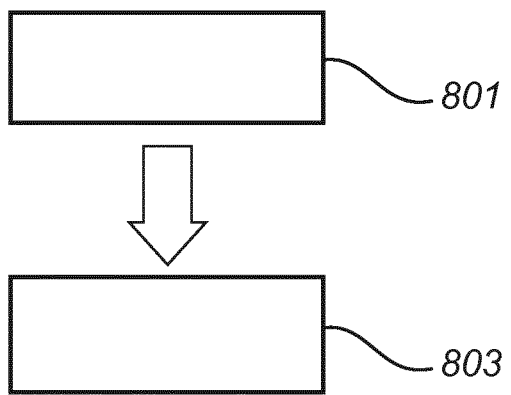
FIG. 4 is a flow chart describing the steps of an alternative method for controlling a turbocharger system in accordance with some example embodiments of the invention.

An alternative embodiment of the present invention will now be described with reference to the flow-chart in FIG. 4, describing a method for controlling a turbocharger system, as e.g. the turbocharger system 10 shown in FIG. 2, fluidly connected to an exhaust manifold of a combustion engine (also shown in FIG. 2), wherein the combustion engine is mechanically coupled to a power take-off arrangement (as the power take-off arrangement 60 shown in FIG. 2). Thus, the reference numerals of FIG. 1 and FIG. 2 are used below when describing the steps of the method in the flow-chart in FIG. 4.

In a first step 801, an external load from the power take-off arrangement 60 requiring engine torque is determined. The external load thus originate from the power take-off arrangement 60 and typically from the hydraulic pump 70 used for pressurizing the hydraulic system 80. As previously described, the external load may be detected by the control unit 50, or may be set and controlled by using the control unit 50.

In a second step 803, in response to the external load from the power take-off arrangement 60, pressurized gas from the tank 40 is injected to the turbocharger turbine 22 such that the turbocharger turbine 22 is at least partly driven by the pressurized gas. Hereby, the speed of the combustion engine 100 needs not to be increased in order to compensate for the power take-off, but the external load from the power take-off arrangement 60 may instead be compensated for by the pressurized gas from the tank 40. Hence, for such embodiments, the speed of the combustion engine 100 needs not to be determined, as regardless of the engine speed, the pressurized gas from the tank 40 is advantageous to use for the power take-off load. As mentioned previously, the external load may originate from the hydraulic pump 70 coupled to the power take-off arrangement 60.

Figure 3:
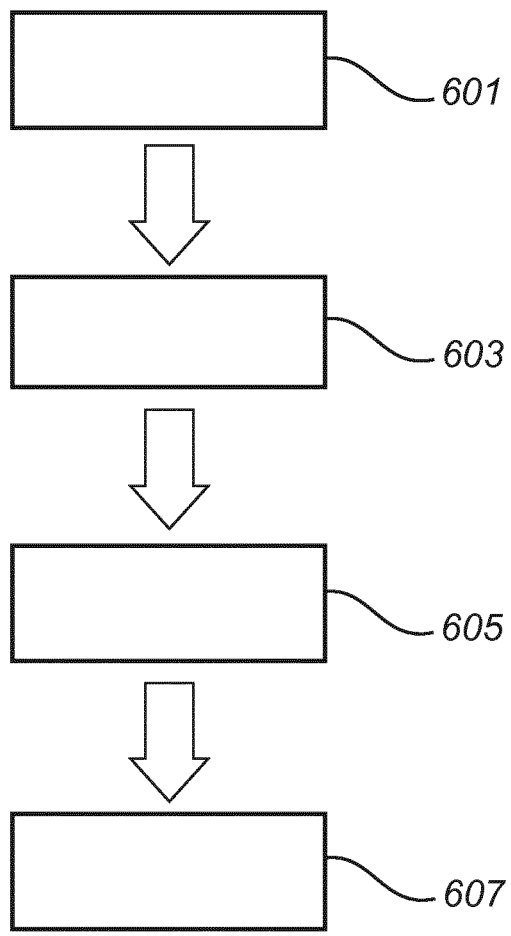
FIG. 3 is a flow chart describing the steps of a method for controlling a turbocharger 30 system in accordance with some example embodiments of the invention.

It should be noted that a step corresponding to the optional third step 605 of FIG. 3 may be carried out between the first step 801 and the second step 803 of the method described with reference to FIG. 4.

The control unit 50 may for example be manifested as a general-purpose processor, an application specific processor, a circuit containing processing components, a group of distributed processing components, a group of distributed computers configured for processing, a field programmable gate array (FPGA), etc. The control unit 50 may further include a microprocessor, microcontroller, programmable digital signal processor or another programmable device. The control unit 50 may also, or instead, include an application specific integrated circuit, a programmable gate array or programmable array logic, a programmable logic device, or a digital signal processor. Where the control unit 50 includes a programmable device such as the microprocessor, microcontroller or programmable digital signal processor mentioned above, the processor may further include computer executable code that controls operation of the programmable device.

The processor (of the control unit 50) may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The control unit 50 is connected to the various described features of the combustion engine 100 and the turbocharger system 10, and is configured to control system parameters. Moreover, the control unit 50 may be embodied by one or more control units, where each control unit may be either a general purpose control unit or a dedicated control unit for performing a specific function.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art.

It should be understood that the control unit 50 may comprise a digital signal processor arranged and configured for digital communication with an off-site server or cloud based server. Thus data may be sent to and from the control unit 50.

It is to be understood that the present invention is not limited to the embodiments described above and illustrated in the drawings; rather, the skilled person will recognize that many changes and modifications may be made within the scope of the appended claims. Thus, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for controlling a turbocharger system fluidly connected to an exhaust manifold of a combustion engine, said turbocharger system comprising a turbocharger turbine operable by exhaust gases from said exhaust manifold, and a tank with a pressurized gas, said tank being fluidly connectable to said turbocharger turbine, said method comprising the steps of:
   determining an engine operational mode in which the combustion engine runs below a predetermined speed,
   determining, when the combustion engine is in said engine operational mode in which the combustion engine runs below the predetermined speed, a predicted external load requiring engine torque which at said engine operational mode would cause the combustion engine to stall, and
   in response to the predicted external load requiring engine torque which at said engine operational mode would cause the combustion engine to stall, injecting the pressurized gas from said tank to drive said turbocharger turbine such that the turbocharger turbine is at least partly driven by said pressurized gas, thereby preventing stalling of the combustion engine.

2. The method according to claim 1, wherein said predetermined speed is 250%, or 150%, or 100% of an idle speed of the combustion engine.

3. The method according to claim 1, wherein said combustion engine is in operative connection with a power take-off arrangement, and wherein said external load is a power take-off load from said power take-off arrangement.

4. The method according to claim 3, wherein said power take-off arrangement is in operative connection with a hydraulic system driven by a hydraulic pump, and wherein said power take-off arrangement is coupled to, and thus driving, said hydraulic pump, and wherein said power take-off load is requested by said hydraulic pump.

5. The method according to claim 1, wherein said external load corresponds to a clutch engagement load.

6. The method according to claim 1, wherein said step of injecting pressurized gas from said tank is independent of an engine speed increasing action of the combustion engine.

7. The method according to claim 1, wherein said turbocharger system comprises a valve for controlling a release of the pressurized gas from said tank, comprising the step of: operating the valve to release the pressurized gas needed for preventing stalling of the combustion engine.

8. The method according to claim 7, wherein the valve is operated such that the pressurized gas is released from said tank during at least 1 second, such as e.g. between 1 second and 5 seconds.

9. The method according to claim 7, wherein said turbocharger system further comprises a turbocharger compressor driven by said turbocharger turbine, and said combustion engine comprises an inlet manifold fluidly connected to said turbocharger compressor, wherein said valve controls the release of the pressurized gas from said tank to one of the exhaust manifold of the combustion engine, an exhaust manifold pipe arranged between the exhaust manifold and the turbocharger turbine, a turbocharger turbine casing, the inlet manifold of the combustion engine, a turbocharger compressor casing, or an inlet manifold pipe arranged between the inlet manifold and the turbocharger compressor.

10. A control unit configured to perform the steps of the method according to claim 1.

11. A non-transitory computer readable medium carrying a computer program comprising program code for performing the steps of claim 1, when said program is run on a computer.

12. A method for controlling a turbocharger system fluidly connected to an exhaust manifold of a combustion engine, wherein said combustion engine is in operative connection with a power take-off arrangement, said turbocharger system comprising a turbocharger turbine operable by exhaust gases from said exhaust manifold, and a tank with a pressurized gas, said tank being fluidly connectable to said turbocharger turbine, said method comprising the steps of: determining, when the combustion engine runs below a predetermined speed, a predicted external load from said power take-off arrangement requiring engine torque, and in response to said external load from said power take-off arrangement, injecting the pressurized gas from said tank to drive said turbocharger turbine such that the turbocharger turbine is at least partly driven by said pressurized gas, thereby preventing stalling of said combustion engine.

13. The method according to claim 12, wherein said power take-off arrangement is in operative connection with a hydraulic system driven by a hydraulic pump, and wherein said power take-off arrangement is coupled to, and thus driving, said hydraulic pump, and wherein said external load is requested by said hydraulic pump.

14. A turbocharger system for use together with a combustion engine having an exhaust manifold, said turbocharger system comprising: a turbocharger turbine operable by exhaust gases from said exhaust manifold, a tank comprising a pressurized gas, said tank being fluidly connectable to said turbocharger turbine, and a control unit characterized in that the control unit is configured to determine an engine operational mode in which the combustion engine runs below a predetermined speed, determine, when the combustion engine runs below the predetermined speed, a predicted external load requiring engine torque which at said engine operational mode would cause the combustion engine to stall, and subsequently initiate injection of the pressurized gas from said tank to drive said turbocharger turbine such that the turbocharger turbine is at least partly driven by said pressurized gas to prevent stalling of the combustion engine.

15. The turbocharger system according to claim 14, wherein said predetermined speed is 250%, 150%, or 100% of an idle speed of the combustion engine.

16. The turbocharger system according to claim 14, wherein said external load originates from at least one of the following: a clutch engagement, a power take-off arrangement, a hydraulic pump.

17. The turbocharger system according to claim 14, further comprising a valve for controlling a release of the pressurized gas from said tank to drive the turbocharger turbine, wherein said control unit is configured to control the operation of the valve to release the pressurized gas needed for preventing stalling of the combustion engine.

18. The turbocharger system according to claim 17, wherein said turbocharger system further comprises a turbocharger compressor driven by said turbocharger turbine, and said combustion engine comprises an inlet manifold fluidly connected to said turbocharger compressor, wherein said valve controls the release of the pressurized gas from said tank to one of the exhaust manifold of the combustion engine, an exhaust manifold pipe arranged between the exhaust manifold and the turbocharger turbine, a turbocharger turbine casing, the inlet manifold of the combustion engine, a turbocharger compressor casing, or an inlet manifold pipe arranged between the inlet manifold and the turbocharger compressor.

19. A vehicle comprising the turbocharger system according to claim 14.

20. A turbocharger system for use together with a combustion engine having an exhaust manifold, said combustion engine being in operative connection with a power take-off arrangement, wherein said turbocharger system comprises: a turbocharger turbine operable by exhaust gases from said exhaust manifold, a tank comprising a pressurized gas, said tank being fluidly connectable to said turbocharger turbine, and a control unit characterized in that the control unit is configured to determine an engine operational mode in which the combustion engine runs below a predetermined speed, determine, when the combustion engine is in said engine operational mode in which the combustion engine runs below the predetermined speed, a predicted external load from said power take-off arrangement requiring engine torque, and in response to said external load from said power take-off arrangement, initiate injection of the pressurized gas from said tank to drive said turbocharger turbine such that the turbocharger turbine is at least partly driven by said pressurized gas to prevent stalling of the combustion engine.

* * * * *